(12) United States Patent
Hammadou

(10) Patent No.: US 8,548,685 B2
(45) Date of Patent: Oct. 1, 2013

(54) INTEGRATED VEHICULAR SYSTEM FOR LOW SPEED COLLISION AVOIDANCE

(75) Inventor: Tarik Hammadou, Surry Hills (AU)

(73) Assignee: Zorg Industries Pty Ltd. (AU)

( * ) Notice: Subject to any disclaimer, the term of this patent is extended or adjusted under 35 U.S.C. 154(b) by 1084 days.

(21) Appl. No.: 11/792,066

(22) PCT Filed: Dec. 1, 2004

(86) PCT No.: PCT/AU2004/001684
§ 371 (c)(1),
(2), (4) Date: Mar. 11, 2008

(87) PCT Pub. No.: WO2006/058360
PCT Pub. Date: Jun. 8, 2006

(65) Prior Publication Data
US 2008/0195284 A1    Aug. 14, 2008

(51) Int. Cl.
*G06F 7/00* (2006.01)

(52) U.S. Cl.
USPC ............. 701/45; 701/301; 382/106; 382/165; 382/274

(58) Field of Classification Search
USPC .............. 701/45, 1, 300, 301, 302; 382/103, 382/104, 106, 165, 274; 356/4.01
See application file for complete search history.

(56) References Cited

U.S. PATENT DOCUMENTS

| 6,542,085 B1 | 4/2003 | Yang ............................. 340/903 |
| 6,693,524 B1 | 2/2004 | Payne .......................... 340/463 |
| 6,757,442 B1 * | 6/2004 | Avinash ........................ 382/274 |
| 7,446,650 B2 * | 11/2008 | Scholfield et al. ............ 340/438 |
| 2002/0057195 A1 | 5/2002 | Yamamura |
| 2003/0088361 A1 | 5/2003 | Sekiguchi ..................... 701/301 |
| 2004/0247157 A1 * | 12/2004 | Lages et al. .................. 382/103 |

FOREIGN PATENT DOCUMENTS

| DE | EP 1447680 | 8/2004 |
| WO | WO 98/00730 | 1/1998 |
| WO | WO 02/103385 A1 * | 12/2002 |
| WO | WO 03/001473 | 1/2003 |

* cited by examiner

*Primary Examiner* — Keith Frisby
(74) *Attorney, Agent, or Firm* — McAndrews, Held & Malloy, Ltd.

(57) ABSTRACT

A method of providing range measurements for use with a vehicle, the method comprising the steps of: a) visually sensing (2) the area adjacent the vehicle to produce visual sense data (22); b) range sensing (26) objects around the vehicle to produce range sense data; c) combining the visual sense data and the range sense data to produce, with respect to the vehicle, an estimate of ranges to the objects around the vehicle (28). The estimate of ranges to the objects around the vehicle may be displayed (29) to a driver.

9 Claims, 3 Drawing Sheets

INTEGRATED VEHICULAR SYSTEM FOR LOW SPEED COLLISION AVOIDANCE

FIELD OF THE INVENTION

The present invention relates to a low speed collision avoidance system and apparatus. In particular, the invention includes a range measurement system and an integrated rear mirror display and enables responding to real time collision information. The rear mirror display provides real time blind spot visual information and obstacle classification and distance measurements.

BACKGROUND OF THE INVENTION

The operator of a vehicle, such as an automobile or truck, normally has adequate visibility for the safe operation of a vehicle. The operator's visibility is enhanced through the well-known use of rearview and side view mirrors. However, when a driver is maneuvering a vehicle into a parking slot he generally cannot see portion of the vehicle that may make a contact.

A current concern among auto consumers and insurers alike is potential cosmetic damage caused by a very low speed collisions. Most vehicles now use a molded panel as part of an integrated bumper assembly. Such bumpers are designed to absorb high-speed impact forces, but are generally too stiff to dissipate the force from the low speed collision on the order of 5 miles per hour. Resultant reaction forces reflected back from a damper might cause cosmetic damage to the bumper panels that require panel replacement.

To solve problems of this nature, vehicular collision avoidance systems have been developed and are now relatively common. Such systems include apparatus for measuring distance between a vehicle and an obstacle in the vehicle's path and apparatus for displaying that distance or at least alerting the operator of an impending collision. For example, U.S. Pat. No. 4,903,004 issued Feb. 20, 1990, and entitled "All-Weather Digital Distance Measuring and Signaling System" (incorporated by cross reference) describes a distance measuring and signaling system for a vehicle specifically intended for accurately measuring distances from obstructions. An array of transducer devices having independent sending and receiving capabilities are mounted on a support frame, such as a bumper. A pulsed signal emanating from a transistor amplifier circuit is timed as it is converted to an ultrasonic wave signal by each transducer device, and simultaneously emitted and received by the transducer devices, and is returned as a pulsed signal. This signal is returned after bouncing back from an obstruction, and the time of the return is converted into a distance value by digital converter circuitry. The digital converter circuitry in turn sends the signal to a digital display device.

U.S. Pat. No. 4,674,073 issued Jun. 16, 1987 and entitled "Reflective Object Detecting Apparatus" describes an apparatus wherein a plurality of ultrasonic transmitting elements and ultrasonic receiving elements are provided and are electrically switched in a sequential manner to allow the existence of an obstacle to be detected. The distance to the object and a particular region at which it is detected is displayed. The ultrasonic transmitting elements and the ultrasonic receiving elements are alternately disposed in a linear array.

Unfortunately, known systems of the type described above generally suffer from a number of problems including detection accuracy, ground detection errors and lack of target classification. For example, whether an object is a static target, an automobile or a pedestrian. Furthermore, known systems are warning systems providing an audible warning sound or visual display.

SUMMARY OF THE INVENTION

It is an object of the present invention to provide an improved range measurement system.

In accordance with a first aspect of the present invention, there is provided a method of providing range measurements for use with a vehicle, the method comprising the steps of: (a) visually sensing the area adjacent the vehicle to produce visual sense data; (b) range sensing object around the vehicle to produce range sense data; (c) combining the visual sense data and the range sense data to produce an estimate of the objects around a vehicle.

The method can further include utilizing the estimate to control the operational characteristics of the vehicle. The control preferably can include altering the bumper collision characteristics of the vehicle. The control preferably can also include altering the braking characteristics of the vehicle. The range sensing preferably can include ultrasound or laser range sensing.

Preferably, the visual sense data can be produced in a luminosity, color and saturation based color space. The color and luminosity components of the color space only are preferably used in the combining step. The sensing step (a) preferably can include segmenting the visual sense data. The method can also include utilizing a series of calibration measurements in the combining step (c).

In accordance with a further aspect of the present invention, there is provided a method for range measuring comprising: (a) capturing an image associated with the range measurement; (b) performing a series of ultrasonic range measurements; (c) performing a series of calibrations of the images to determine a transformation matrix equation to find the relationship between the image points and the corresponding 3D world co-ordinates (X,Y,Z); (d) segmenting the images by Classify pixel as black or white using a threshold m in an intensity channel I, calculating a hue (H) for the pixel and segmenting the image using an upper and lower thresholds.

Preferably the method also includes the step of smoothing the segmented image so as to reduce noise therein and matching the targets found in the vision system to the targets found in the ultrasonic system.

The method can be carried out in a vehicle and the method further preferably can include the step of: monitoring the vehicle to activate the method when predetermined conditions are preferably present. The predetermined conditions can include whether the vehicle can be in reverse.

BRIEF DESCRIPTION OF THE DRAWINGS

Preferred embodiments of the present invention are illustrated in the the accompanying drawings. The drawings should not be taken to limit the invention to the specific embodiments, but are for explanation and understanding. In the drawings.

DETAILED DESCRIPTION OF THE PREFERRED EMBODIMENTS

Preferred embodiments of the invention are capable of sensing and classifying targets for imminent low speed collision and based on the information given by the collision avoidance system configuring the bumper to reduce the impact damage. The system sends information to a central automobile Parking Electronic Control Unit (PECU), which recognizes the collision data and calls separate subroutines or enables dedicated systems to both modulate the brake system and to configure the bumper dampers.

Figure 1:
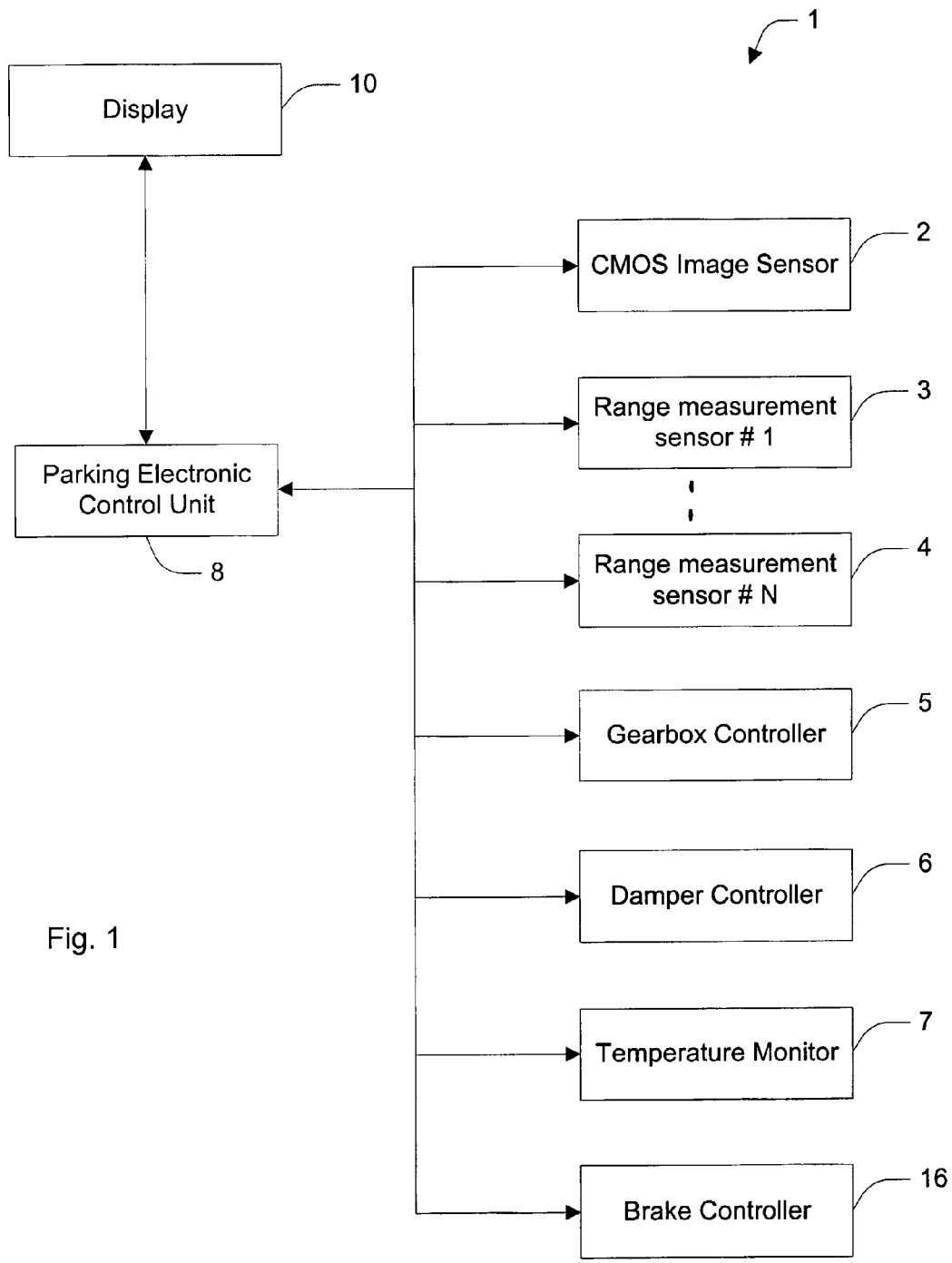
FIG. 1 is a schematic illustration of the control portions of the preferred embodiment.

An example arrangement of the preferred embodiment is illustrated schematically in FIG. 1. A number of devices 2-7 are mounted on the car, including a CMOS image sensor 2, a series of ultrasound range sensors 3-4, a gearbox controller 5, a bumper bar damper controller 6 and a temperature monitor 7, where the devices 2-7 are interconnected with a Parking Electronic Control Unit (PECU) 8, which can comprise an embedded microcontroller and associated software. Also connected to the PECU is an interactive display 10.

The PECU is responsible for utilizing information from the Range Measurement Sensors and Image Sensor to provide real time information for display on the display device 10. The PECU 8 also processes the received information and sends control information to the dedicated devices, such as the brake system, the bumper damper control system, and the display system.

The PECU detects objects by using image processing techniques and range measurement devices, which can include ultrasonic transducers, millimeter-wave sensors, or (LIDAR) Light Detection and Range devices. The information is processed to perform target classification tasks, false alarm detection, and data calibration, and the information is sent to the human machine interface, for example on the interactive LCD display 10, formatted as an image featuring the detected objects and the distance measured for each object.

The PECU can also provide collision information data to the automobile central Electronic Control Unit (ECU) via a vehicle multiplex communication bus, for example a standard CAN bus. Based on the information received, the central ECU can enable dedicated systems to both modulate the brake system and to configure the bumper dampers.

The preferred embodiment thereby provides a method and system for low speed collision avoidance, using range measurement system and an integrated rear mirror display providing data during collision or preceding a collision to adjust the vehicle bumper damper using a damper controller mechanism and enable a brake control system that responds to a real time collision information. The Image Sensor 2 can comprise a vision-imaging devices CCD, CMOS or any state of the art image sensor and a set of range measurement sensors, Lidar, Radar, preferably ultrasonic sensors of any type (MEMS, pizoceramic . . . ). The sensors including the imaging device are controlled and interrogated by the Parking Electronic Control Unit to provide 3 dimensional information data of the scene.

As the speed of sound varies as the square root of temperature, so it is desirable to monitor temperature via temperature sensor 7 to maintain accuracy. Random fluctuations in air temperature and density will give rise to errors in the ultrasonic measurement. The accuracy is also limited by the temporal resolution of the signal detection, and the noise within the system. It is therefore desirable to provide temperature data in order to extract higher accuracy from the sensor.

The image produced by the PECU for display on display 10 is a 2D array of points (U,V). A given point in the image is related to the position of a corresponding point in a target. The relationship between the image points and the corresponding 3D world coordinate (X', Y', Z) can be determined by a transformation matrix equation processed after calibration. The accuracy of the overall calibration can be checked by measuring the position of a target within the field of view of the two sensors, finding the range from the ultrasonic sensors, determining its (U,V) co-ordinates in the image, and using the camera and determining calibration parameters to estimate its position. The transformation matrix equation can be optimized by artificial Neural Networks methods or statistical methods.

Object detection may be the only function required from a sensing system; detection is also a pre-requisite for doing measurement and/or identification. Thus, the combined system must able to tell how many objects are present, and must be able to match targets detected in the ultrasonic system with target in the vision system.

Object detection is relatively straightforward with the ultrasonic system. Because of the amount of information in a video image, object detection may be more difficult. It is necessary to reduce this information to provide the data, which is required to detect and measure the target components. There are a variety of options in image processing available to do this with the ultimate aim, generally, of segmenting the image points into background and object points and labelling the different objects points. Techniques for image segmentation are well known and fully set out in the standard textbooks.

Therefore, an active object detection method can be developed where the objects detection information from the ultrasonic sensor are used to locate the same objects in the camera image. The ultrasonic system gives 2D target co-ordinates, which can be denoted as (X, Y), while the height of the target, Z, is unknown. Using the calibration parameters, the position of the top of the target within the image can be predicted for any given height Z.

The matching algorithm is used to match the targets detected by the ultrasonic system to those found by the vision system. The process operates as follows. Each system detects a set of targets. The ultrasonic system assigns YZ co-ordinates to each target, while each identified target in the vision system will have a set of (U,V) co-ordinates. The centre of each target in the vision system is calculated and the (X,Y,Z) co-ordinates corresponding to each ultrasonic target Z values calculated. The targets can then be matched using the best fit of Y values.

Figure 2:
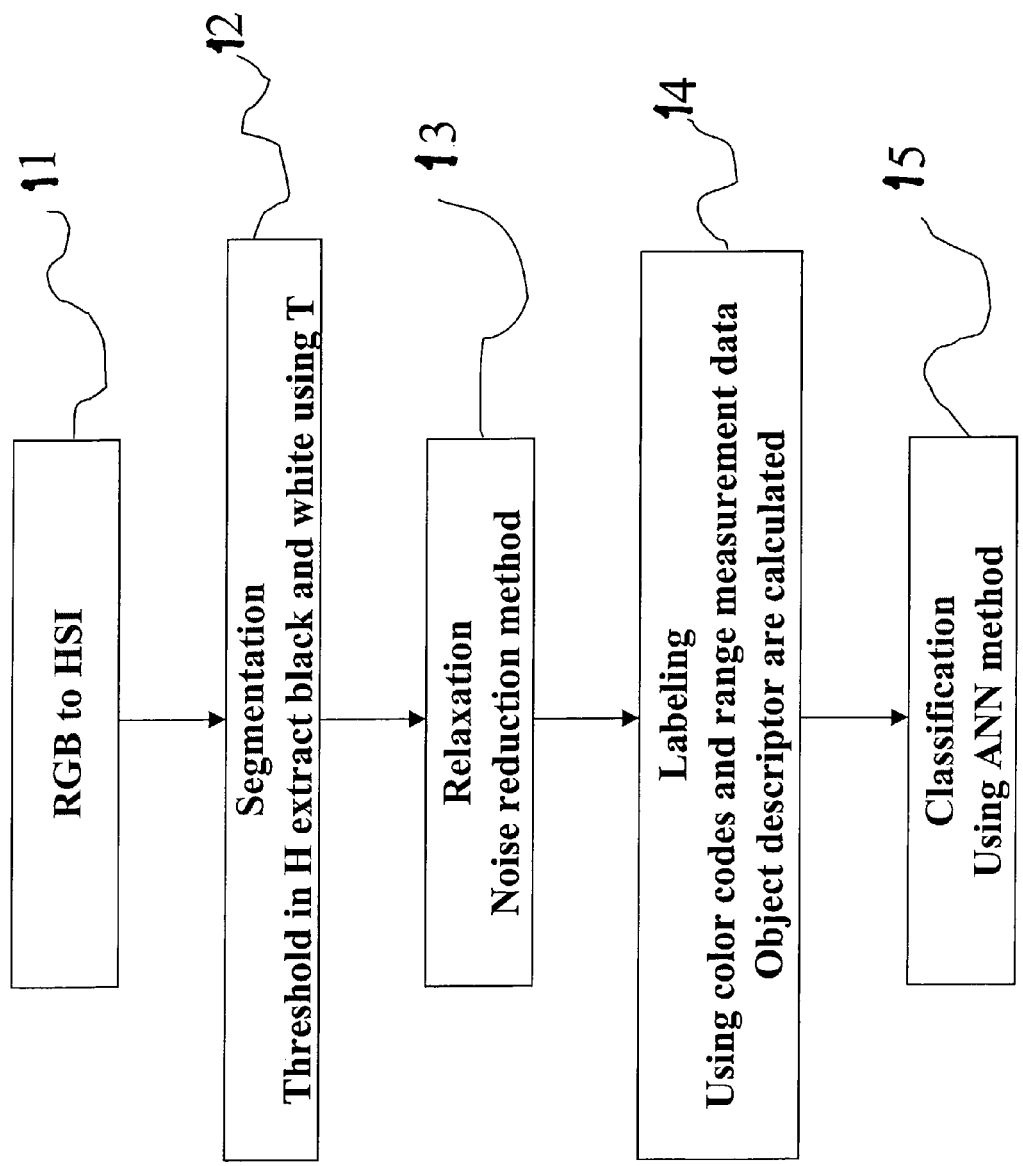
FIG. 2 illustrates a flow chart of the steps in image classification.

FIG. 2 illustrates the steps involved in the range and 2D imaging fusion process. In the first step 11, the RGB representation from the imaging device is transferred into a HSI (hue, saturation, and intensity) space representation. The reason for this is to make the analysis insensitive to differences in lights or shading. Transformation from RGB to HSI is done using the mathematical formulas described with the following equations:

$$I = \frac{1}{3}(R + G + B)$$

$$S = I - \frac{3}{R + G + B} \min(R, G, B)$$

$$H = \arccos\left[\frac{1/2(R - G) + R - B)}{\sqrt{(R - G)^2 + (R - B)(G - B)}}\right]$$

If $B > G \Rightarrow H = 360° - H$

After performing the transformation, the number of channels is reduced by discarding the S channel. Hence the complexity is transferred from 3 channels to 1 or 2. The H Channel is most relevant (and may be I) for finding interesting targets (objects). S does not necessarily need to be calculated. Hue (H) is the variable, which represents color tone. A disc with 0-255 levels represents Hue. By this representation, the color is described with one dimension instead of three. From this representation, interesting objects can be threshold using their color values.

The conversion to HSI space allows the analysis to be substantially insensitive to differences in lights or shading effects. The HSI representation includes a separate channel for the intensity (I). Hue (H) is the variable, which represents color tone. The transformation results in the complexity being transferred from three channels to one or two. H can be considered as adisc with gradus 0-360 and can be represented with 256 gray levels (8 bits).

A segmentation process 12 can be done in parallel with the calculation of H. The segmentation process can proceed as follows:

1. Classify pixel as black or white using a threshold m in the intensity channel I.
2. Calculate H for pixel.
3. Segment using upper and lower thresholds.
4. Assign a class ID to each segment.

Its class ID now represents each pixel. There are N different color classes and one background class, depending on the objects. For simplicity we assume 8 different color classes, which can be coded in 4 bits.

The classes can be outlined as follows:

| Objects | Colour |
| --- | --- |
| >1.5 m | background |
| <1.5 m, >0.80 m | Green |
| <0.80 m, >0.30 m | Yellow |
| <0.30 m | Red |

Every pixel is given a number indicating their class. Depending on their class and the class of the neighbors, the pixels are labeled 14. A relaxation 13 is performed prior to labeling to minimize the number of pixels to which erroneous objects belong. This is considered to be a noise reducing method.

Relaxation 13

The purpose of a relaxation algorithm is to reduce noise and misclassifed pixels. This step is performed once the segmentation is completed. A relaxation sets a pixel's class value based on its neighbour's class values (i.e. averages pixels). It follows that the image will be more homogenous in terms of object classes, because erroneous pixels will be adjusted. If this step is performed, over segmentation should be avoided, which would otherwise complicate the classification. One form of relaxation can proceed by, for each pixel, look in a n×n neighbourhood and assign the current pixel to the group of which most of its neighbours belong to. Given a pixel's x and y coordinate, loop around its neighbours and let counters describe the number of pixels belonging to each class. Set the current pixels class belonging to the class which has the largest number of members in the current surrounding. Simulations have showed that an 11×11 filter is most suitable, regarding efficiency and speed.

Pixel Labeling 14.

Objects will represented with 4{connectivity (the background will then have 8{connectivity3). The labelling is performed by filtering the image once, and then scanning over the image to do updates. What differs from the original algorithm is that it takes care of object pixels of different class belongings. Two connected components that do not belong to the class cannot get the same label. The labeling algorithm can be as follows:

```
IF object pixel A > 0 {
IF object pixel A = belonging B or C
A = MIN label(B,C) update equivalence table with B = C
ELSE
A = new label
ELSE
check next pixel
}
```

During the labeling phase, descriptors are calculated for each object, e.g. area, perimeter, distance etc using data from the ultrasonic system and the match algorithm described in the previous section. Based on the descriptors each object is classified 15.

A particular advantage of the integrated system is that combinations of targets, which could be difficult to distinguish with one or other system, can be readily separated by the combined system. For instance, the ultrasonic sensor easily distinguishes two targets at broadly similar angle at different ranges, but not by the vision sensor, while two targets with the same range at slightly different angle are more easily separated by the vision than by the ultrasonic sensor.

Another advantage of the integrated system of the is providing ultrasonic false alarm detection for example ground detection, which could be difficult to classify with just the ultrasonic sensors. The detection level can be set based on a learning algorithm based on data from the image sensor.

Figure 3:
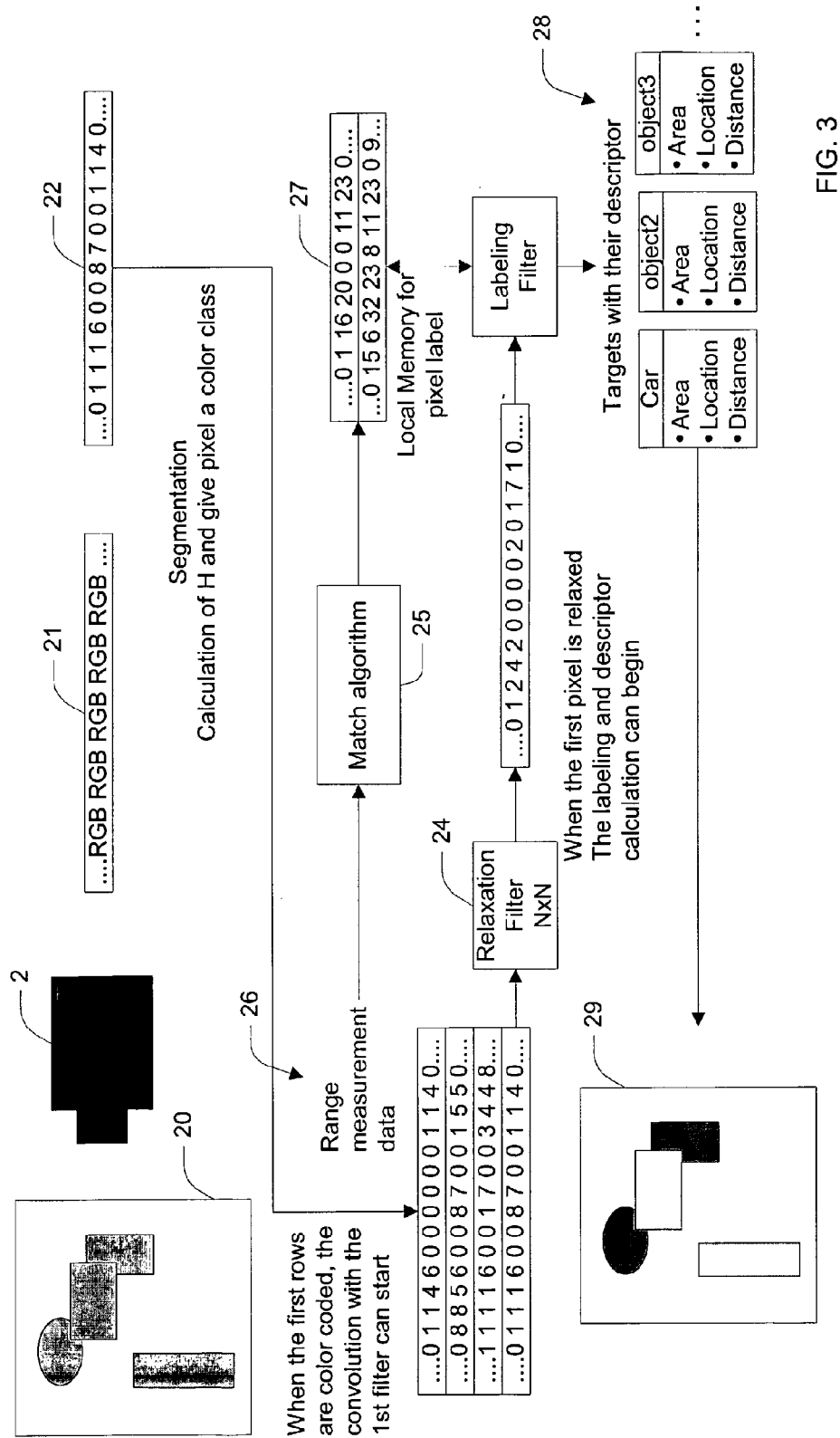
FIG. 3 illustrates the process of image classification.

FIG. 3 provides an illustration of the steps of FIG. 2. The scene 20 is imaged by sensor 2 to produce a video stream 21. The video stream is segmented into pixel color classes 22. This information is then low pass filtered 24 in a relaxation process. The information is then compared 25 with corresponding ultra sound range measurement data 26 so as to provide information on possible object 27. This information is then interrogated and objects analysed and labeled 28. The objects are then displayed 29 on the display.

As a further modification, the preferred embodiment can include a damper controller mechanism (6 of FIG. 1). The mechanism alters the dampener structure at low speeds and responds to the real time collision information from the Parking Electronic Control Unit (PECU) 8. Similarly, the brake control system 16 can also interact with the PECU so as to automatically slow the vehicle during maneuvers as objects approach. The PECU can communicate with different vehicle electronic control units (ECUs) within the vehicle, like temperature, speed or velocity, gearbox control unit, and brake control via a Control Area Network (CAN) bus.

For example the PECU receive information from the gearbox controller 5 to activate the rear parking system. This information is transmitted via the CAN bus, the PECU receives the information from the speed or velocity electronic unit in order to operate a parking mode, and therefore activate forward detection sensors.

The forgoing describes preferred embodiments of the present invention. Modifications, obvious to those skilled in the art can be made thereto without departing from the scope of the invention.

I claim:

1. A method of providing range measurements for use with a vehicle, the method comprising:
   visually sensing the area adjacent to the vehicle to produce visual sense data;
   range sensing objects around the vehicle to produce range sense data;
   segmenting the visual sense data by means of thresholding the intensity and hue of the visual sense data and assigning at least one class value to each of the pixels within the visual sense data, to produce segmented visual sense data, wherein the at least one class value indicates at least one class of pixels;

relaxing the segmented visual sense data by:
  altering the assigned at least one class value for at least a portion of the pixels; and
  leaving unchanged the assigned at least one class value for a remaining portion of the pixels, wherein the relaxing is based on a class value of at least one neighboring pixel; and combining the segmented and relaxed visual sense data and the range sense data to produce an estimate of the objects around a vehicle.

2. The method according to claim 1, comprising utilizing said estimate to control the operational characteristics of said vehicle, wherein said estimate comprises at least one object descriptor calculated based on the assigned at least one class value.

3. The method according to claim 2, wherein said controlling includes altering the bumper collision characteristics of said vehicle.

4. The method according to claim 2, wherein said controlling includes altering the braking characteristics of said vehicle.

5. The method according to claim 1, wherein said range sensing includes ultrasound or laser range sensing.

6. The method according to claim 1, where said visual sense data is produced in a luminosity, color and saturation based color space.

7. The method according to claim 6, wherein the color and luminosity components of said color space only are used in said combining step.

8. The method according to claim 1, wherein said segmenting of said visual sense data comprises segmenting by classifying pixels as black or white.

9. The method according to claim 1, comprising:
  utilizing a series of calibration measurements in said combining of the segmented and relaxed visual sense data and the range sense data.

* * * * *